Figure 1:
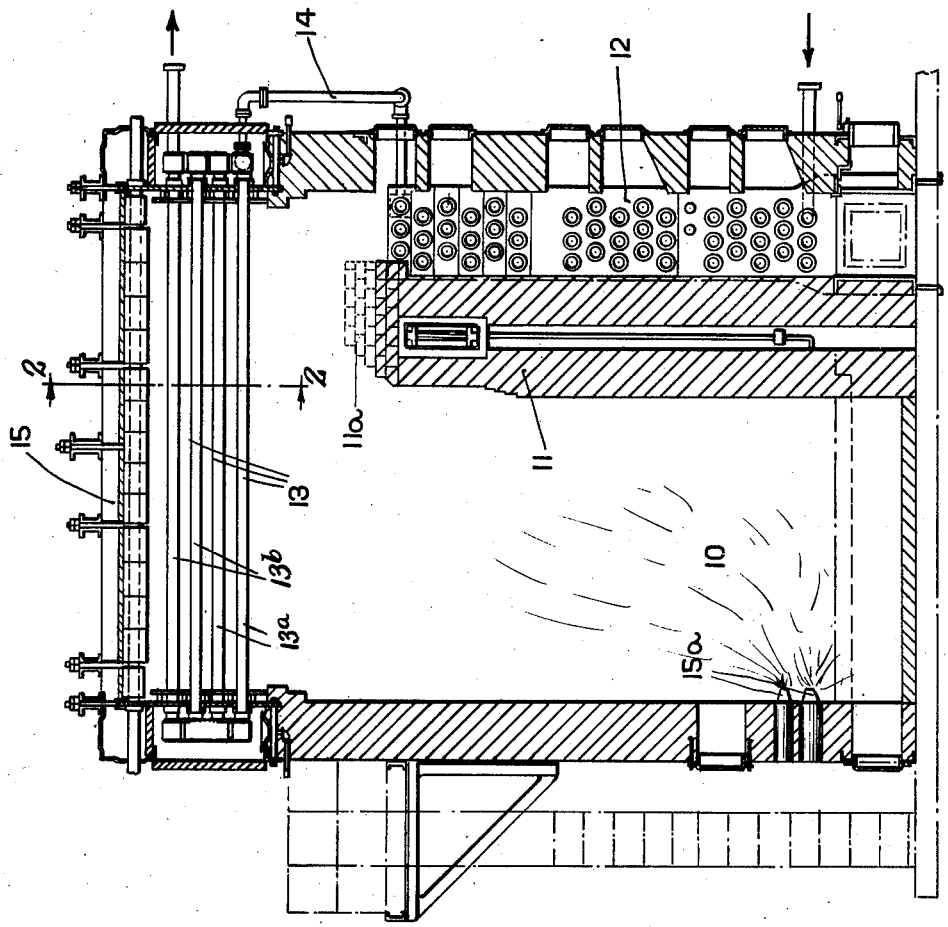

April 10, 1934.	J. PRIMROSE	1,954,647
OIL HEATER
Filed Nov. 17, 1926    2 Sheets-Sheet 1

INVENTOR
John Primrose
BY
Cooper, Kerr & Dunham
ATTORNEYS

April 10, 1934.　　　　J. PRIMROSE　　　　1,954,647
OIL HEATER
Filed Nov. 17, 1926　　2 Sheets-Sheet 2

INVENTOR
JOHN PRIMROSE
BY
William McKnight
ATTORNEY

Patented Apr. 10, 1934

1,954,647

UNITED STATES PATENT OFFICE 1,954,647

OIL HEATER

John Primrose, Dongan Hills, N. Y., assignor to Foster Wheeler Corporation, a corporation of New York Application November 17, 1926, Serial No. 148,795

7 Claims. (Cl. 196—116)

This invention relates to improvements in oil stills.

In cracking of petroleum it is of considerable importance that overheating of the petroleum be prevented. In cracking processes, further, it is desirable that provision be made for bringing the oil up to the cracking temperature and thereafter maintaining it at that temperature for the considerable period of time which is necessary to carry out the cracking reaction. During the time that the oil is kept at such cracking temperature, provision should be made for preventing the oil from taking up excessive quantities of additional heat which would cause overheating with excessive formation of carbon, etc.

In certain apparatus and processes heretofore employed, provision has been made for entirely separating the radiant heat component derived from the furnace and applying this component separately to one part of the oil which is to be heated, and for separately applying to the oil the heat of convection from the hot gases of combustion which emanate from the furnace. Such a method of procedure does not give the highest efficiency since the radiant heat transmitting characteristics of the parts, which are intended to separate the heat of radiation from the heat of convection, decrease, after the apparatus has been in use for a period of time. Furthermore, these constructions are subject to more or less rapid deterioration and also of themselves must cut down the amount of heat which is transmitted, notwithstanding the fact that they are made of materials having a relatively high heat conductivity when new.

According to the present invention, provision is made for heating the oil in the different stages without attempting to separate the heat of radiation from the heat of convection.

According to the present invention, provision is made for passing a quantity of oil to be treated through successive heat absorbing surfaces. One of these surfaces takes up heat substantially and entirely by convection from the hot gases which traverse it. Preferably, after the oil passes through this first heat absorbing surface, it passes into a second heat absorbing surface where additional heat is taken up and then into a third heat absorbing surface. The heat absorbed in the second and third surfaces is taken up partly by convection and partly by direct and wholly unrestricted radiation. The disposition of the second and third mentioned surfaces and their heat absorbing characteristics are such that no additional provision whatsoever need be made for separating the radiant heat component from the heat of convection. On the contrary, the desirable effects of absorbing heat partly by convection, are preserved without however, overheating the oil. The second and third mentioned heat absorbers are of such characteristic that a quantity of heat is abstracted, which will prevent excessive overheating either in said second or third heat absorber or in the first heat absorber which is swept over and which receives heat by convection from hot gases.

The arrangement of the heat absorbers is such that the second mentioned heat absorber effects controlling action itself upon the gas temperature and prevents overheating of the oil in the heat absorber receiving heat by convection.

Further and other objects of the invention will be hereinafter described in connection with the accompanying drawings, which shows by way of illustration, a preferred embodiment of my invention.

Figure 2:
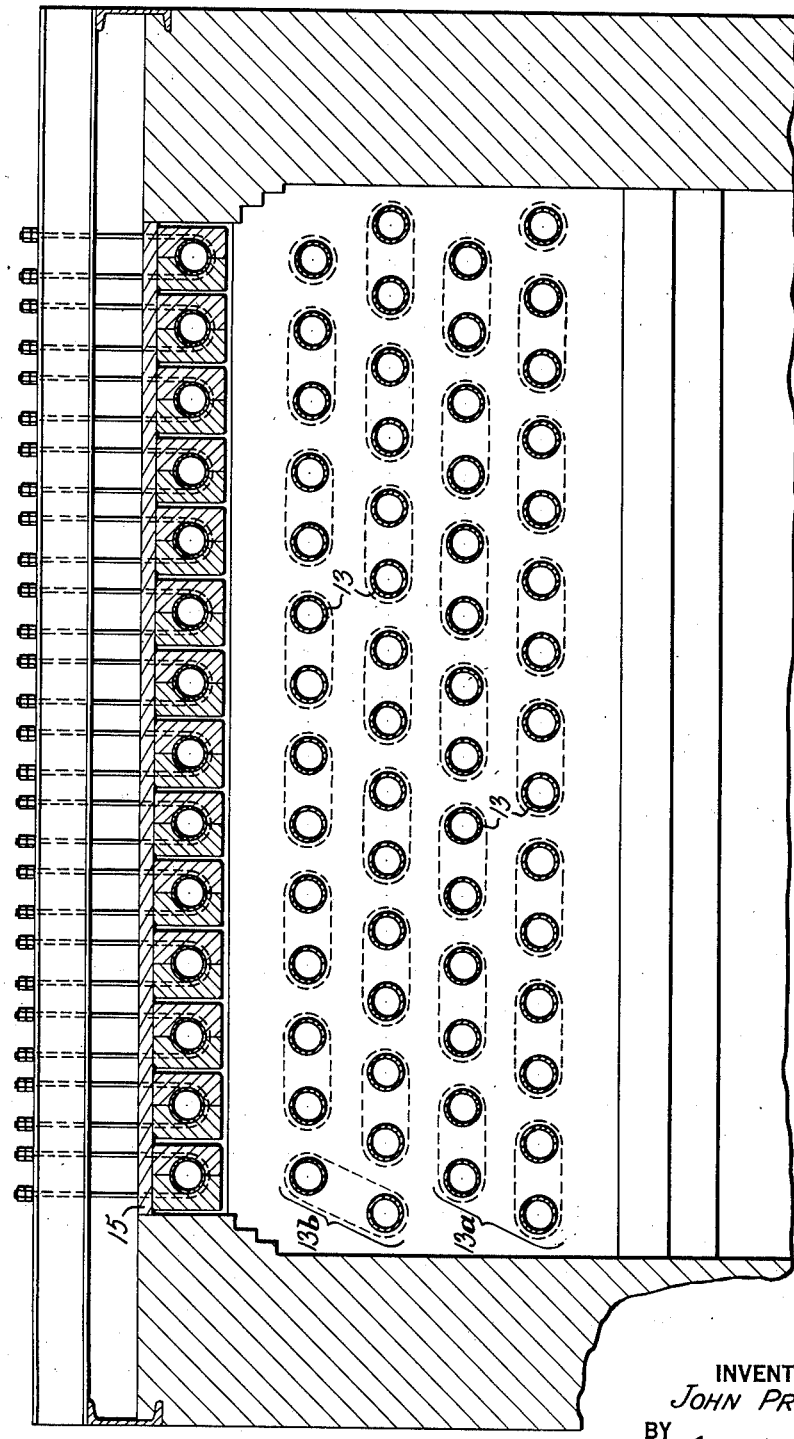

In the drawings:

Fig. 1 is a vertical longitudinal sectional view of apparatus embodying the present invention; and Fig. 2 is a transverse sectional view taken substantially on the line 2—2 of Fig. 1 and illustrating the staggered arrangement of the tubes disposed under the roof.

Referring to the drawings, the apparatus comprises a furnace having a heating or furnace chamber 10 and any suitable means 15a for developing a hot fire in the lower part of the furnace chamber. Within the furnace chamber there is disposed a bridge wall 11. In back of the bridge wall is a heat absorbing surface 12 which is of the form shown in my former Patent No. 1,568,182 and which is adapted to take up heat substantially entirely by convection from the hot gases which pass over the top of the bridge wall and down over the surface. In the top of the furnace chamber and preferably, but not necessarily extending over the heating bank 12, I provide an absorbing surface generally designated at 13. This heat absorbing surface comprises a plurality of superimposed rows of tubes having any desired header connections at their ends. As shown in the drawings, the tubes are staggered. The lower two rows 13a constitute the second tube group. These two rows receive heat substantially entirely by radiation. The upper two rows 13b constitute the third group and receive heat substantially wholly by convection. The oil emerging from the heating bank 12 can be admitted into the heating bank 13 by any suitable conduit 14. The oil preferably flows through the first, second and third tube groups in the order named, as shown on the drawings. The upper rows of tubes 13b keep the oil at the desired cracking temperature for the additional time which is so desirable in cracking. At the same time the location of the tubes 13b is such, being adjacent to the upper roof portion 15 of the furnace, and preferably screened from the furnace by the tubes of the second rows, that these tubes do not receive excessive quantities of heat and in consequence thereof, the oil therein is not overheated so as to cause excessive formation of carbon or fixed gas.

The relative location of the tubes is an important factor for the proper operation of the apparatus and for obtaining the desired results. It is well known that tubes which are subject to the direct radiant heat of a fire can receive too much heat if these tubes also absorb excessive quantities of heat by convection. On the other hand, the transfer of some heat by convection is desirable, as it, particularly with superimposed rows of the tubes, imparts heat to tubes which may be so disposed as to be shielded from the direct radiant heat rays.

With the present apparatus, the heat imparted by convection to the upper heat absorber 13b, is imparted thereto by forced convection from a continuous and non-circulating flow of the gases of combustion, that is to say, any gases which enter the heating bank 13 and which are cooled by imparting their heat by convection to the oil, do not again enter the bank 13 as they would in constructions where there is a material convection with recirculation of gas or heated air. On the other hand, the hot gases from the fire enter the bank 13 and upon being cooled, depart therefrom and pass out of the apparatus over the bank 12. In this way, a more efficient transfer of heat is secured to the bank 13 and in addition the somewhat cooled gases leaving bank 13 can commingle with the other gases passing over the bank 12 and reduce the mean temperature of the gas stream over bank 12.

Accordingly, in carrying out the present invention, the heating bank 13 is so disposed relatively to the top of the bridge wall that there is a comparatively slow movement of the hot gases traversing the tubes 13. This result is secured by relatively increasing the intervening space between the top of the bridge wall 11 and the lowermost tubes of the bank 13 to a greater extent than in any constructions heretofore devised by me in which the roof tubes were relatively more closely spaced to the top of the bridge wall. The reasons for so relatively spacing the bank 13 from the top of the bridge wall can be thus explained. The spacing is such as to first permit some turbulence of the hot gases over the tubes, but the turbulent effect is controlled and prevented from becoming excessive and thereby possibly causing overheating of the petroleum in the bank 13. There is a second result secured by so spacing the tubes, which is that the distance of the tubes 13 from the fire is increased whereby the radiant heat effect thereon is somewhat reduced. As is well known the direct radiant heat transmission varies as the square of the distance and by increasing the distance from the fire which is the source of the radiant heat, the heat transferred by radiation can be cut down to the desired limiting extent. Furthermore, it is preferable in practice to proportion the heating surface 13 relatively to the amount of heat liberated from the combustion of the fuel so as to provide a heat absorbing surface which will maintain a preferred furnace temperature. In practice it is preferable that this temperature should not exceed about 1500° F.

It is further desirable in an apparatus of this sort to provide for a free flow of gas from the furnace chamber into the heating bank which receives heat by convection. Accordingly, therefore, the opening above the bridge wall preferably, extends entirely across the furnace chamber. Restricted passages for flow of gas at this point should be avoided as such restricted passages would cause excessive turbulence of the hot gases in and around the heating bank 13 which excessive turbulence would act accumulatively with the heat of radiation and bring about overheating of the oil in the tubes 13.

There is another factor which the present apparatus provides for and that is to provide it against and prevent excessive heating of the heat absorbing surface 12 and of the oil therein by the hot gases passing over this bank which impart heat by convection thereto. The amount of heat taken up by the heat absorbing surface 12 will depend upon two factors. First, the temperature of the gases and second, the volume of gases sweeping over the tubes. Some constructions have controlled the gas temperature by utilizing excess air decreasing the operating efficiency of the apparatus. It is desirable therefore, to prevent overheating without at the same time necessitating the use of excess air to cut down the temperature of the gases. According to the present invention, the temperature of the gases sweeping over the bank 12 is controlled and lowered by use of the heat absorbing surface 13. This surface is of such heat absorbing character and size, that a sufficient quantity of heat is abstracted from the fire by the aforesaid surface 13 as to prevent the gases passing over 12 from exceeding certain desired temperatures. This result is primarily brought about by providing a sufficient heat absorbing area in the bank 13. Provision of sufficient area in this bank will allow so much heat to be taken out from the fire that the gases which traverse bank 12 can be maintained at a relatively lower temperature than heretofore. This lowering of the temperatures of the gases by the surface 13 provides for a further advantage in that it allows the amount of excess air to be diminished thereby giving higher over all operating efficiencies.

With a given apparatus, it is possible to increase or diminish the heat given up by convection to the upper heating bank 13 merely by varying the height of the bridge wall 11. The height of the bridge wall will directly control the rate of flow of the gases over the top heating surface 13 and thus will enable both the quantity of heat given to upper surface by forced convection to be varied and will also control the temperature of the gases entering bank 12.

What I claim is:

1. An oil still furnace comprising side walls and a roof, a bridge wall extending upwardly, terminating short of the roof and dividing the oil still furnace into a heating chamber and a heat absorption chamber, means for producing combustion emitting radiant heat in the heating chamber, a first tube group comprising a plurality of fluid-conveying tubes in the heat absorption chamber, a second tube group comprising a plurality of rows of fluid-conveying tubes under the roof and arranged above the top of the bridge wall and spaced from said top of the bridge wall and exposed to direct radiant heat, a third group of fluid-conveying tubes above said second group, the tubes of said second tube group being so spaced relative to each other as to prevent reflection of radiant heat rays from the roof into the heat absorption chamber and so arranged as to screen the tubes of said third group from radiant heat, and conduits interconnecting said groups of tubes.

2. An oil still furnace comprising side walls and a roof, a bridge wall extending upwardly, terminating short of the roof and dividing the oil still furnace into a heating chamber and a heat absorption chamber, means for producing combustion emitting radiant heat in the heating chamber, a first tube group comprising a plurality of fluid-conveying tubes in the heat absorption chamber, a second tube group comprising a plurality of rows of fluid-conveying tubes under the roof and arranged above the top of the bridge wall and spaced from said top of the bridge wall and exposed to direct radiant heat, a third group of fluid-conveying tubes above said second group, the tubes of said second tube group being so spaced relative to each other as to prevent reflection of radiant heat rays from the roof into the heat absorption chamber and so arranged as to screen the tubes of said third group from radiant heat, and means for conducting oil from the first tube group to the second tube group and from the second tube group to the third tube group.

3. An oil still furnace comprising side walls and a roof, a bridge wall extending upwardly, terminating short of the roof and dividing the oil still furnace into a heating chamber and a heat absorption chamber, means for producing combustion emitting radiant heat in the heating chamber, a first tube group comprising a plurality of fluid-conveying tubes in the heat absorption chamber, a second tube group comprising a plurality of rows of fluid-conveying tubes under the entire roof and arranged above the top of the bridge wall and spaced from said top of the bridge wall and exposed to direct radiant heat, a third group of fluid-conveying tubes above said second group, the tubes of said second tube group being so spaced relative to each other as to prevent reflection of radiant heat rays from the roof into the heat absorption chamber and so arranged as to screen the tubes of said third group from radiant heat, and conduits interconnecting said groups of tubes, said bridge wall being of such height that the third group is in a zone in which there is a comparatively slow movement of gases.

4. An oil still furnace comprising side walls and a roof, a bridge wall extending upwardly, terminating short of the roof and dividing the oil still furnace into a heating chamber and a heat absorption chamber, means for producing combustion emitting radiant heat in the heating chamber, a first tube group comprising a plurality of fluid-conveying tubes in the heat absorption chamber, a second tube group comprising a plurality of rows of fluid-conveying tubes under the roof and disposed at a higher elevation than the top of the bridge wall and exposed to direct radiant heat, a third group of fluid-conveying tubes above the second group, the tubes of the second group being so spaced relative to each other as to substantially screen the tubes of the third group from radiant heat, and conduits interconnecting said groups of tubes.

5. An oil still furnace comprising side walls and a roof, a bridge wall extending upwardly, terminating short of the roof and dividing the oil still furnace into a heating chamber and a heat absorption chamber, means for producing combustion emitting radiant heat in the heating chamber, a first tube group comprising a plurality of fluid-conveying tubes in the heat absorption chamber, a second tube group comprising a plurality of rows of fluid-conveying tubes under the roof and disposed at a higher elevation than the top of the bridge wall and exposed to direct radiant heat, a third group of fluid-conveying tubes above the second group, the tubes of the second group being so spaced relative to each other as to substantially screen the tubes of the third group from radiant heat, and means for conducting oil from the first tube group to the second tube group and from the second tube group to the third tube group.

6. An oil still furnace comprising side walls and a roof, a bridge wall extending upwardly, terminating short of the roof and dividing the oil still furnace into a heating chamber and a heat absorption chamber, means for producing combustion emitting radiant heat in the heating chamber, a first tube group comprising a plurality of fluid-conveying tubes in the heat absorption chamber, a second tube group comprising a plurality of rows of fluid-conveying tubes under the entire roof and arranged above the top of the bridge wall and spaced from said top of the bridge wall and exposed to direct radiant heat, a third group of fluid-conveying tubes above said second group, the tubes of said second group being so arranged as to screen the tubes of said third group from radiant heat, and conduits interconnecting said groups of tubes, said bridge wall being of such height that the third group is in a zone in which there is a comparatively slow movement of gases.

7. A fluid heating furnace comprising side walls and a roof, a bridge wall extending upwardly, terminating short of the roof and dividing the fluid heating furnace into a heating chamber and a heat absorption chamber, means for producing combustion emitting radiant heat in the heating chamber, a first tube group comprising a plurality of fluid-conveying tubes in the heat absorption chamber, a second tube group comprising a plurality of rows of fluid-conveying tubes under the roof and disposed at a higher elevation than the top of the bridge wall, a third group of fluid-conveying tubes above the second group, the tubes of the second group being so spaced relative to each other as to screen the tubes of the third group from radiant heat, and conduits interconnecting said groups of tubes.

JOHN PRIMROSE.